United States Patent [19]

Stark et al.

[11] 4,302,102
[45] Nov. 24, 1981

[54] APPARATUS AND METHOD FOR USING ROLLS OF LIGHT SENSITIVE PAPER IN A REPRODUCTION MACHINE

[76] Inventors: Gary M. Stark, 7 E. 19th St., New York, N.Y. 10003; Alan D. Wagner, 48 Marlene Dr., Syosset, N.Y. 11791

[21] Appl. No.: 96,997

[22] Filed: Nov. 23, 1979

[51] Int. Cl.³ .............................................. G03B 27/58
[52] U.S. Cl. ..................................... 355/72; 206/389; 206/408; 242/55.2; 355/77
[58] Field of Search ............................ 355/72, 77, 3 R; 346/136; 206/389, 408; 242/68, 55.2, 55, 198, 67.3, 71.1

[56] References Cited

U.S. PATENT DOCUMENTS 4,218,135  8/1980  Tsuda et al. ........................... 355/72

FOREIGN PATENT DOCUMENTS 466713  1/1969  Switzerland ........................... 355/72

Primary Examiner—Richard A. Wintercorn
Attorney, Agent, or Firm—Posnack, Roberts, Cohen & Spiecens

[57] ABSTRACT

An apparatus comprising a reproduction machine and a casing therein to hold a spool of light sensitive paper. The casing has a movable cover which forms an opening together with the casing for the light sensitive paper. The cover, when in a closed position has a light tight relationship with the casing. The cover is provided with at least one recess to avoid interference with the internal structure of the machine when the cover is opened.

25 Claims, 10 Drawing Figures

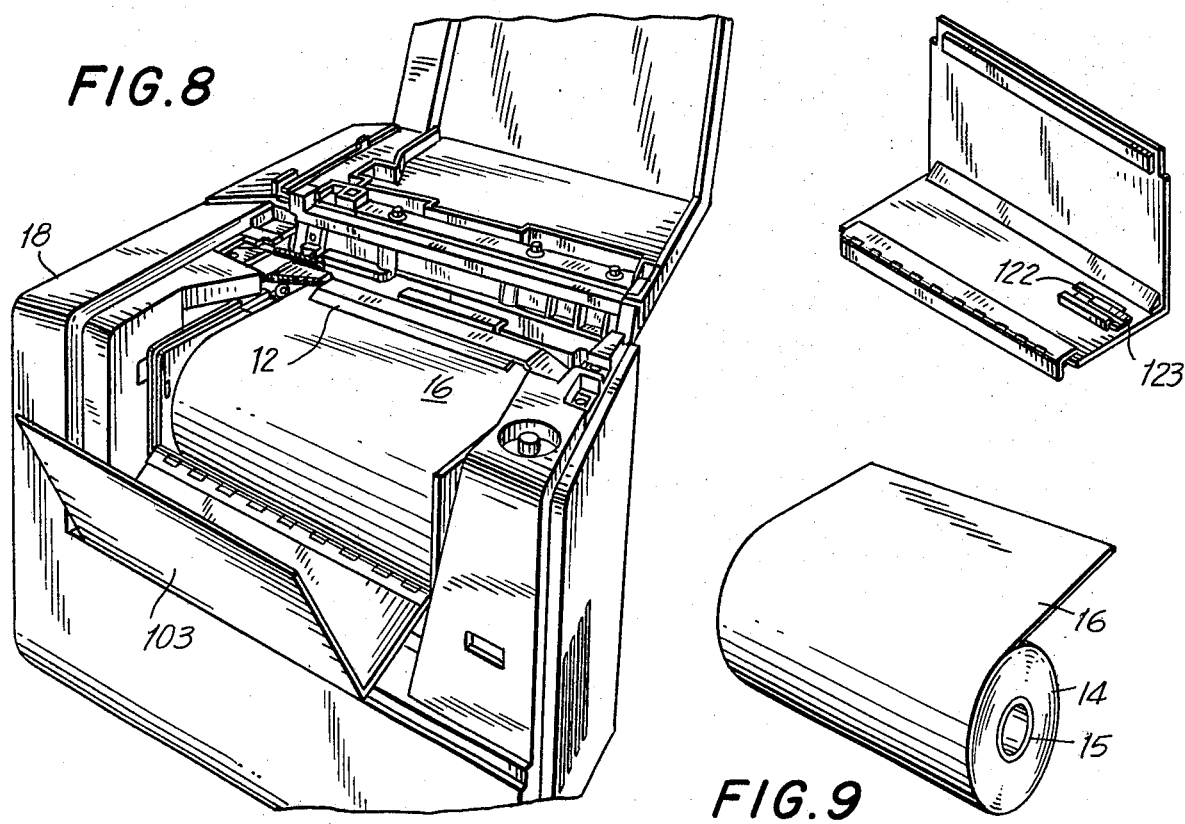
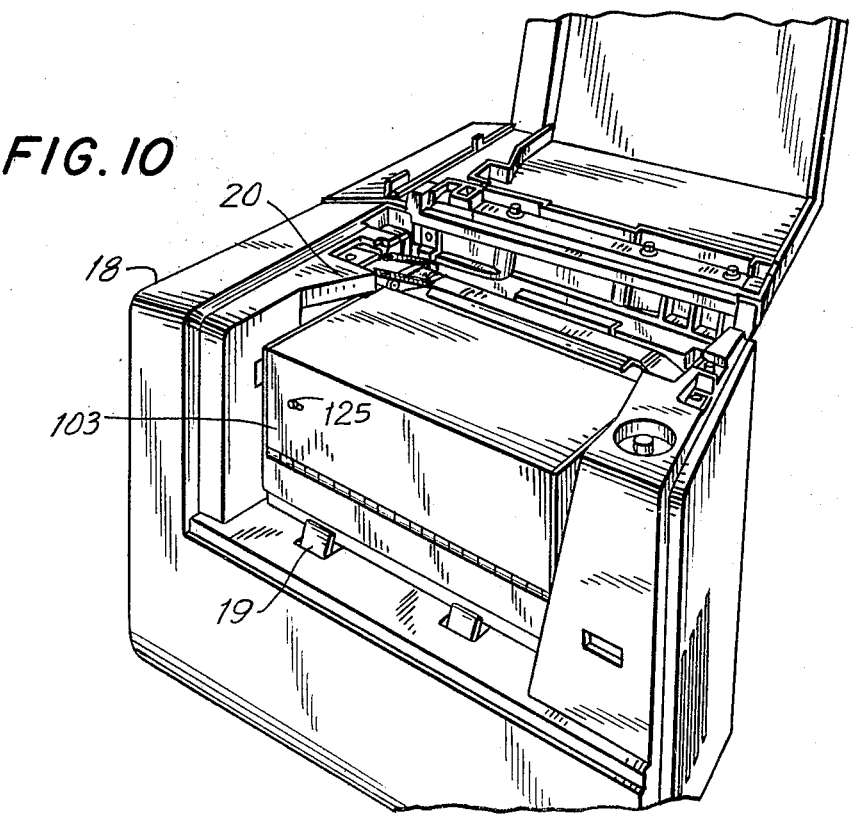

APPARATUS AND METHOD FOR USING ROLLS OF LIGHT SENSITIVE PAPER IN A REPRODUCTION MACHINE

FIELD OF INVENTION

This invention relates to the installation of a light sensitive medium into a reproduction machine or the like and, more particularly, to apparatus and methods for using a roll of light sensitive paper in an image reproducing apparatus.

BACKGROUND OF INVENTION

In recent times, a new process has been developed for use in microfilm retrieval machines utilizing light sensitive paper sometimes referred to as dry silver paper. Dry silver copy making requires no toners or chemicals to make a paper copy from microfilm and uses only light and heat. A new line of microfilm retrieval machines designed to use dry silver paper has been recently introduced into the market. These machines are designed to accommodate dry silver paper in a particular sealed disposable cartridge. Such sealed disposable cartridges are expensive and have limited sources at the present time.

While light sensitive dry silver paper is commercially available, it cannot be installed directly into these machines nor in the sealed disposable cartridges made for these new machines. It is thus a disadvantage of these machines, to the user that a limited selection of paper can be used since the light sensitive paper cannot be directly installed into the machine without risking exposing all or part of the roll of paper. A further reason for not being able to install a roll of paper directly into these machines is that the space in the paper housing area of such machines is designed so that any roll of paper set on the base platform of such space would be on a downward angle. This means that when the paper is fed into the machine it would automatically be out of line and thus would continually jam in the machine.

SUMMARY OF INVENTION

It is an object of the invention to provide an improved container for light sensitive paper to be installed in a microfilm retrieval machine.

It is another object of the invention to provide an improved container to be installed in said machine which container does not require an alteration of the construction of the associated machine.

It is a further object of the invention to make such container substantially light tight and easy to load and unload.

Yet another object of the invention is to provide an improved container for light sensitive paper to be installed in said machines which does not cause faulty paper tracking and thus does not cause paper jams in the associated machine.

Another object of the invention is to provide a container as specified above which is rigid and strong enough to be a substantially permanent piece within the associated machine and is never-the-less removable, if necessary, and preferably of a one piece construction.

In achieving the above and other objects of the invention, a reproduction machine and, more specifically, a microfilm retrieval machine is provided including internal structure. Such internal structure includes a housing area for light sensitive paper to be inserted into the further internal structure of the machine. A casing is provided within the machine. Into this casing fits a spool for a roll of light sensitive paper. A movable cover is provided for the casing and together with the body of the casing forms an opening for the light sensitive paper wound around the spool to leave the casing and enter into the internal structure of the reproduction machine. When the paper is inserted into the casing and is fed out of the opening and into the internal structure of the machine and the cover is in a closed position, the cover is maintained in a light tight relationship with the casing. In addition, the cover is provided with at least one recess to avoid interference with the internal structure of the machine when the cover is opened. When the cover is closed, a light tight relationship is formed due to means on the casing which cooperates with the cover at the recess to maintain such light tight relationship.

In further achieving the above objects of the invention, means for securing the casing in the reproduction machine are provided on the casing. Such means may include one or more recesses on the bottom of the casing opposite the cover of the casing. The casing may further include a hinging means for attaching the cover to the casing such as a piano type hinge and locking means for locking the cover in a closed position.

The cover may be substantially rectangular and have two side edges along the width of the cover and a front edge adjacent the opening for the light sensitive paper. Along each side edge is provided a recess along the end of the side edge adjoining the front edge of the cover. The two outer walls of the casing adjoining the side edges of the cover should be no less than 8 3/16 inches and no greater than 9⅝ inches from the outer surface of one outer wall to the other surface of the other outer wall and preferably said dimension is about 9½ inches. The length of the front edge of the cover should be no less than 8 3/16 inches and no greater than 9¼ and preferably about 9 inches long. The side walls of the casing may be comprised of three sections. The outer section defines the outer surface and a middle section adjacent the outer section is of sufficiently smaller length or width to form a recess into which the side edges of the cover fit when the cover is in a closed position. The inside section, adjacent the middle section, forms a third and unique recess which is adapted for supporting the spool of light sensitive paper. The inside surface, in addition, may be used to form a stop for the cover of the casing.

In further achieving the objects of the invention, a method is provided for installing a roll of light sensitive reproduction paper into a microfilm retrieval machine. To effect such method, an openable substantially light tight casing is placed into the machine and then opened. A roll of light sensitive reproduction paper is positioned in a casing and one end of the light sensitive paper is inserted into the internal structure of the reproduction machine. The casing is then closed and the paper is thus installed into the machine which is then ready for use.

The internal structure of the reproduction machine includes apparatus which receives the light sensitive paper and makes the actual copy. Also included in the internal structure of the reproduction machine is a base platform upon which the casing holding the spool of light sensitive paper is placed. The base platform includes means for securing the casing to the internal structure of the machine.

In order to reduce any static charge that may be built up on the paper, a strip of electrically conductive material such as copper sheeting is placed in the reproduction machine adjacent the light sensitive paper and in the vicinity of where the paper leaves the casing and enters into the internal structure of the machine.

The above and other objects, features and advantages of the invention will be apparent from the following detailed description as illustrated in the accompanying drawing.

BRIEF DESCRIPTION OF DRAWING

In the drawing:

FIG. 7 is an inside view of the cover of the casing;

FIG. 8 is a perspective view of the casing in an open position and inserted into an accommodating machine;

FIG. 9 is a perspective view of the spool with light sensitive paper wound thereon; and FIG. 10 is a perspective view of the casing in a closed position and inserted into said machine.

DETAILED DESCRIPTION

Basically, the preferred embodiment of the invention comprises a box or casing which is designed to be inserted into microfilm retrieval reproduction machine. The box once inserted into the machine can be opened and rolls of dry silver light sensitive paper may be supported in the box with the cover of the box being closed to maintain a light-tight relationship. An advantage is that any make of dry silver paper which can be wound around a spool which fits into the casing can be used in the machine.

Figure 1:
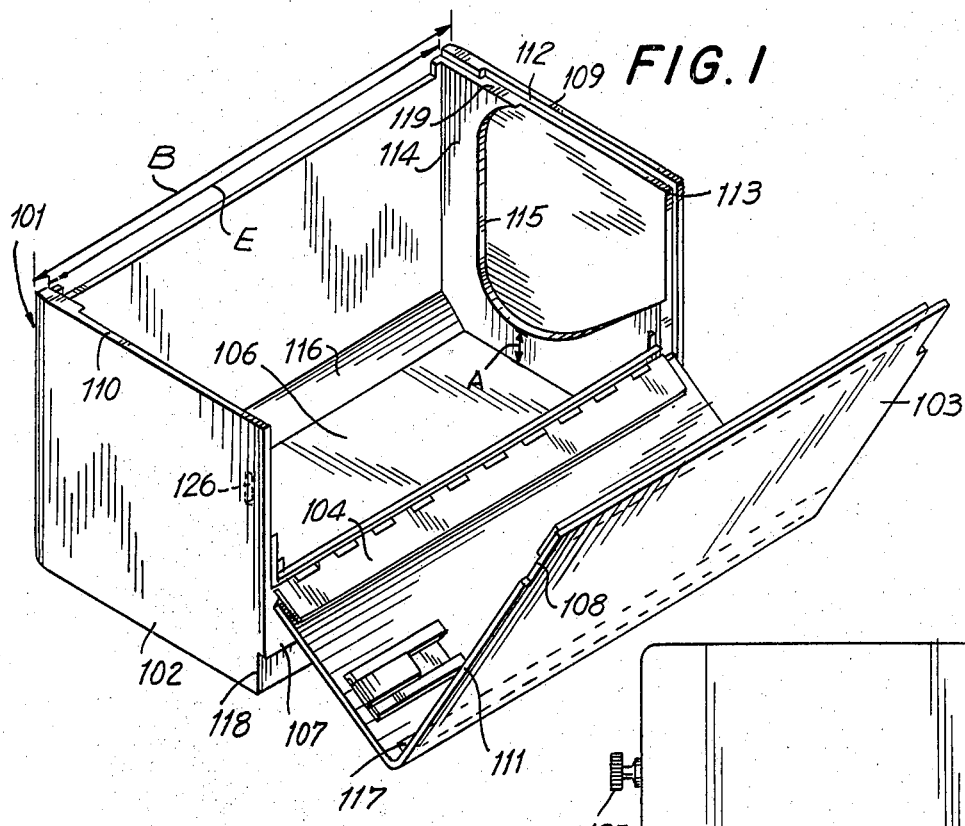
FIG. 1 is a top perspective view showing the casing of the invention in an open position.
Figure 3:
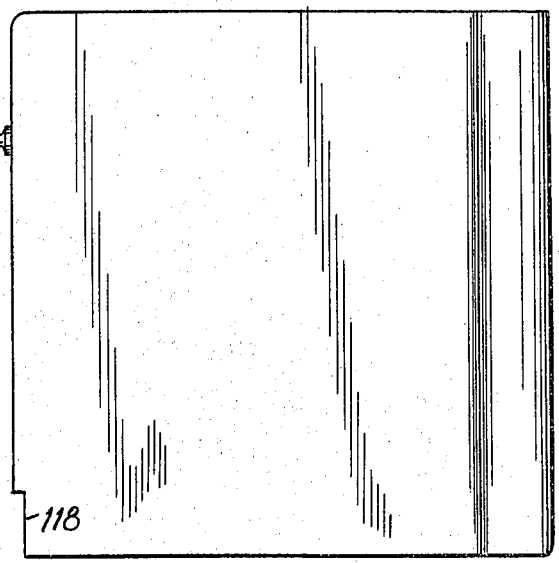
FIG. 3 is a side view of the right side thereof.

In FIG. 1, the casing 101 is shown in an open position. The casing has side walls 102, a front wall 105, and a bottom 106. A cover 103 is provided on the casing and is shown hinged to a back wall 107 of the casing by means of a piano type hinge 104. The cover is provided with recesses 108 which are designed to avoid interference with the internal structure of the reproduction machine into which the casing is inserted, namely, protrusion 20 of FIG. 10.

The side walls are constructed in three sections. The outer section 109 defines the outer surface of the casing and has a top edge 110 substantially the same length as the side edge 111 of the cover and is provided with a recess of substantially the same width as recess 108 in the cover and of a length substantially equal to the difference in the length of the edge 111 of said cover less the length of the recess. The middle section 112 of the side wall 102 is adjacent the outer section and is of sufficiently smaller length and width to form a recess 113 which is substantially the same width as the thickness of the cover so that the cover when in a closed position rests on top of and along-side of said middle section thus insuring a light-tight relationship. The inside section 114 of the side wall 102 is adjacent the middle section 112 and forms another recess 115 which is curved and adapted for supporting the spool for the dry silver light sensitive paper. A tangent to the curve of the recess drawn parallel to the bottom surface of the casing 106 is in a range of $1\frac{1}{8}$ to 1 1/16 inches from said bottom surface and is shown as distance A. The curve has a radius of approximately $1\frac{1}{4}$ inches at the intersection of said tangent with the curve. The curve of the recess continues upward towards the back wall 107 of said casing at an angle of approximately 45° so that the spool, when placed inside the casing, is automatically positioned.

The casing may be of a rigid material such as polyethylene, polypropylene, polystyrene and the like, and is preferably of a non-reflective color. In the preferred embodiment, the material is made of a rigid black plastic $\frac{1}{8}$ of an inch in thickness. Each of the sections of the side wall is comprised of such $\frac{1}{8}$ inch rigid plastic material. Triangular supports 116 and 117 are provided at the intersections of the front and back walls and at the vertex of the cover of the casing.

Figure 2:
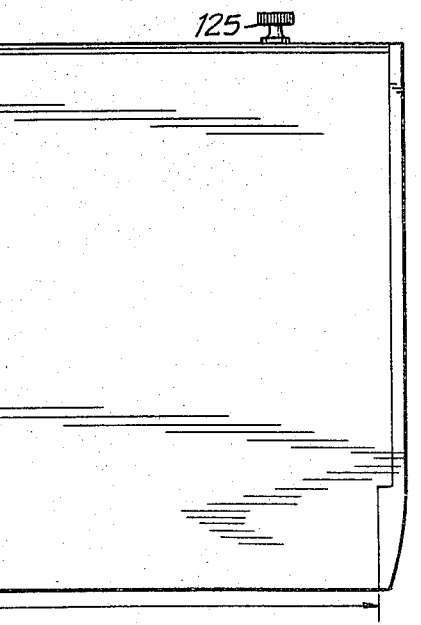
FIG. 2 is a top view of the casing in a closed position.

In FIG. 2, the top of the cover is shown in a closed position and the cooperative relationship of recess 108 and top edge 110 of the side wall is clearly shown.

Figure 5:
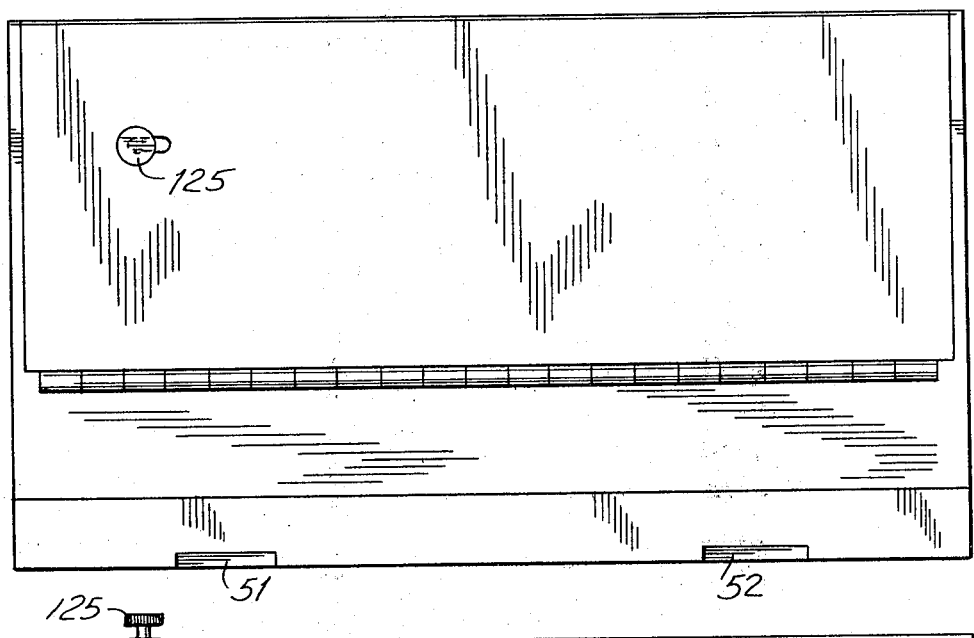
FIG. 5 is a rear view thereof.
Figure 6:
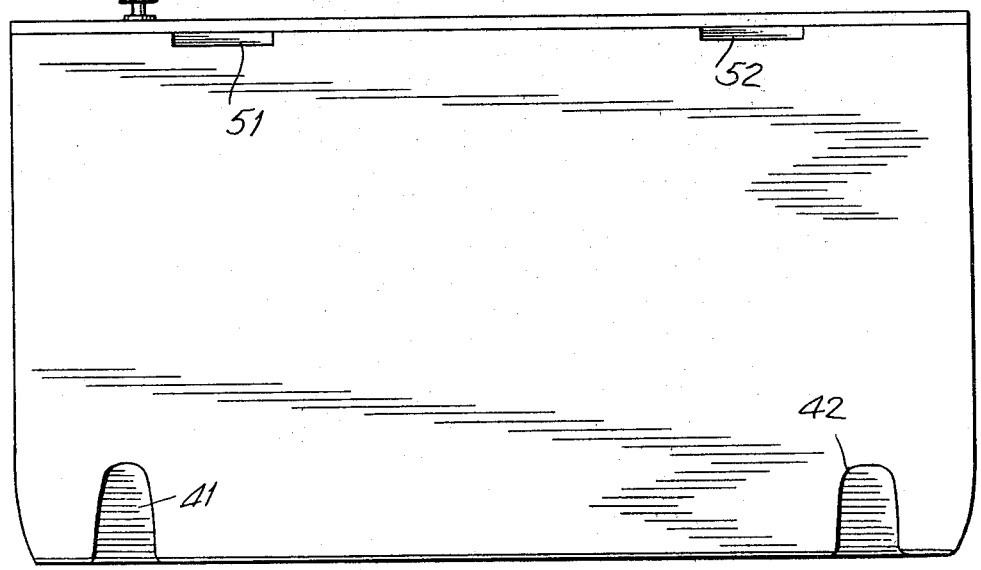
FIG. 6 is a bottom view thereof.

The casing is provided with small recesses 41,42 and 51,52 which are to accommodate the internal structure of the machine so the casing will fit snugly therein. In FIG. 10, clamps 19 are shown which press against recess 51 as shown in FIG. 5. Recess 118 is shown in the rear wall of the casing which is provided to accommodate the internal structure of the reproduction machine.

Figure 4:
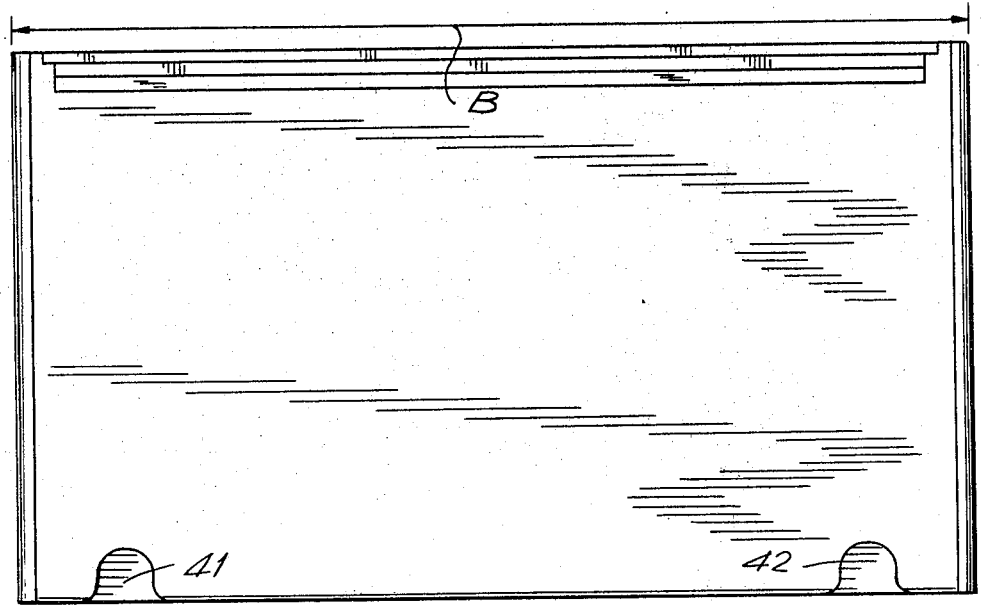
FIG. 4 is a front view thereof.

In FIG. 4, the cover is shown in a closed position whereby the cover and the front wall of the casing form an opening for the light sensitive paper to exit from the casing and enter into the internal structure of the reproduction machine.

In the preferred embodiment, the distance between the outside surface of the outer walls (shown in FIG. 4 as distance B) is no less than 9 3/16 inches and no greater than $9\frac{5}{8}$ inches and preferably is about $9\frac{1}{2}$ inches. The front edge of the cover is measured as distance E in FIG. 2 and is preferably in the range of 8 3/16 to $9\frac{1}{4}$ inches and in the preferred embodiment is about 9 inches long.

The inside section has an upper edge 119 which may be substantially parallel to the upper edge of the middle section so as to form a stop for the cover when in the closed position. The inside section should be of a sufficient thickness so that the recess portion of the cover of the casing will rest upon the upper edge of the inside section thereby insuring a light-tight relationship as well as a stop.

In FIGS. 8 and 10, the casing is shown inserted into the reproduction machine 18. The casing is in opened position in FIG. 8 and closed position in FIG. 10. It can be seen that the recesses of the cover are designed to accommodate the protrusion 20 of the internal structure of the reproduction machine. Electrically conductive material 12 such as copper sheeting is placed in the reproduction machine adjacent the paper 16 where the paper leaves the casing and enters into the internal structure of the machine. This is done to remove the static charge on the paper and thus prevent jamming in the machine.

In FIG. 9 a roll 14 of dry silver paper 16 is shown wound around a spool 15 which is about 9 inches long. Once the casing is inserted into the reproduction machine, the spool and paper wound thereon may be easily inserted into the casing and the casing closed thereby reloading the paper into the reproduction machine in an easy process. Means for locking the cover in a closed position is shown in FIG. 1, FIG. 2 and FIGS. 5 and 7. Said means comprises a sliding latch 123 which is placed inside track 122 on the inside of the cover. The latch is attached to handle 125 which is on the outside of the cover and is located within hole 124. The hole is no larger than latch 123 so that light is not allowed to enter the casing through the hole. When the box is in a closed position, the latch is inserted into recess 126 of the middle section of the outside wall thereby maintaining the cover in a closed position.

From what has been described above, it can be seen that an apparatus and a method for installing a roll of light sensitive reproduction paper is provided for a machine which was designed to use only paper enclosed in a sealed disposable cartridge. The user now has the option of using any type of dry silver paper which can be wound around the spool and fit into the casing. The casing is easy to load and unload, yet maintains a light-tight container for the paper which is very sensitive to light. The container is positioned in the machine so that the paper will not jam in the machine nor track incorrectly. The container is rigid and strong enough to be a substantially permanent piece within the machine yet is still removable, if necessary, and is of a one piece construction. The invention allows considerable economy.

There will now be obvious to those skilled in the art many modifications and variations of the methods and constructions as set forth hereinabove. These modifications and variations will not depart from the scope of the invention if defined by the following claims.

What is claimed is:

1. Apparatus comprising a reproduction machine including internal structure, a casing releasably located within said machine, a spool for light-sensitive paper within said casing, a movable cover on said casing and having open and closed positions relative thereto, said cover and casing forming an opening for the light sensitive paper on said spool to leave said casing and enter into the internal structure of said reproduction machine, said cover, when in a closed position with the light sensitive paper leaving said casing, having a light-tight relationship with said casing, means on said casing to cooperate with the cover to maintain said light-tight relationship, and locking means for locking said cover in said closed position, said locking means comprising a latch means and a recess means, said latch means and recess means being associated with said cover and said casing, said latch means being movable between a first position in which it is released from said recess means and a second position in which it is engaged with said recess means, said latch means being constructed to prevent admission of light into said casing when the cover is closed and said latch means is in its first and second positions.

2. Apparatus as claimed in claim 1 wherein said reproduction machine includes securing means for securing said casing in said reproduction machine and said casing comprises means for accommodating said securing means.

3. Apparatus as claimed in claim 2 wherein said casing comprises hinge means for attaching said cover to said casing.

4. Apparatus as claimed in claim 1 wherein said cover is substantially rectangular and has two side edges along the width of said cover and a front edge adjacent the opening for light sensitive paper, each side edge having an end adjoining said front edge, a recess being provided along each of said side edges, each of said recesses being along the end of the respective side edge adjoining said front edge.

5. Apparatus as claimed in claim 4 wherein said casing comprises two outer walls each having inside and outside surfaces, said outer walls adjoining said side edges of said cover, the outside surfaces of said outer walls being no less than 9 3/16 inches and no greater than 9⅝ inches from each other, and said front edge of said cover is no less than 8 3/16 inches and no greater than 9¼ inches long so that the spool for the light sensitive paper fits into the casing, and the casing fits into the reproduction machine.

6. Apparatus as claimed in claim 5 wherein the outer surfaces are 9½ inches from each other and said front edge of said cover is 9 inches long.

7. Apparatus as claimed in claim 5 wherein said side walls comprise an outer section defining the outside surface, a middle section adjacent the outer section and of a smaller length and width dimensions to form a second recess into which the sides of said cover fit when the cover is in a closed position, and an inside section adjacent said middle section and forming a third recess adapted for supporting said spool.

8. Apparatus as claimed in claim 7 wherein said casing has a rear wall and said third recess is adapted for supporting said spool and forms a curve having a radius of approximately 1¼ inches and slopes toward the rear wall of the casing at a slope of approximately 45°.

9. A paper holder for light sensitive paper to be used in a reproduction machine comprising a casing, a spool for light sensitive paper within said casing, a movable cover on said casing and having an open and closed position relative thereto, said cover and casing forming an opening for the light sensitive paper on said spool to leave said casing and enter into the internal structure of said reproduction machine, said cover when in a closed position with the light sensitive paper leaving said casing having a light tight relationship with said casing, means on said casing to cooperate with the cover to maintain said light tight relationship, and locking means for locking said cover in said closed position, said locking means comprising a latch means and a recess means, said latch means and recess means being associated with said cover and said casing, said latch means being movable between a first position in which it is released from said recess means and a second position in which it is engaged with said recess means, said latch means being constructed to prevent admission of light into said casing when the cover is closed and said latch means is in its first and second positions.

10. Apparatus as claimed in claim 9 wherein said casing comprises means for securing said casing in said reproduction machine.

11. Apparatus as claimed in claim 10 wherein said casing comprises hinge means for attaching said cover to said casing.

12. Apparatus as claimed in claim 9 wherein said cover is substantially rectangular and has two side edges along the width of said cover and a front edge adjacent the opening for light sensitive paper, each side edge having an end adjoining said front edge, and one recess along each of said side edges, each of said recesses being along the end of the respective side edge adjoining said front edge.

13. Apparatus as claimed in claim 12 wherein said casing comprises two outer walls each having inside and outside surfaces, said outer walls adjoining said edges of said cover, the outside surfaces of said outer walls being no less than 9 3/16 inches and no greater than 9⅝ inches from each other, and said front edge of said cover is no less than 8 3/16 inches and no greater than 9¼ inches long.

14. Apparatus as claimed in claim 13 wherein the outer surfaces are 9½ inches from each other and said front edge of said cover being 9 inches long.

15. Apparatus as claimed in claim 13 wherein said side walls comprise an outer section defining the outside surface, a middle section adjacent the outer section and of sufficiently smaller length or width dimensions to form a second recess into which the sides of said cover fit when the cover is in a closed position, and an inside section adjacent said middle section and forming a third recess adapted for supporting said spool and guiding said spool into position in the casing.

16. Apparatus as claimed in claim 15 wherein said inside section also forms a stop for said cover.

17. A method for installing a roll of light sensitive reproduction paper into a reproduction machine having an internal structure comprising placing an openable substantially light tight casing into said machine, opening said casing, positioning the roll of reproduction paper into said casing, inserting one end of the light sensitive paper into the internal structure of the reproduction machine, closing said casing and releasably locking said casing by moving a closure latch to a closed position, the latch blocking light entry into the casing in locked and unlocked conditions of the casing.

18. A method as claimed in claim 17 wherein said machine comprises a casing, a spool for light sensitive paper within said casing a moveable cover to said casing, said cover and casing forming an opening for the light sensitive paper on said spool to leave said casing and enter into the internal structure of the reproduction machine, said cover, when in a closed position with the light sensitive paper leaving said casing, having a light tight relationship with said casing, said cover being provided with at least one recess to avoid interference with the internal structure of the machine when the cover is opened, and means on said casing to cooperate with the cover at said recess to maintain said light tight relationship.

19. A method as claimed in claim 17 further comprising bleeding off electrostatic charges on said roll of paper by placing a strip of electrically conductive material in the reproductive machine adjacent to the light sensitive paper and in the vicinity where said paper leaves said casing and enters into the internal structure of said machine.

20. Apparatus as claimed in claim 1 wherein said latch means comprises a slidable latch engageable with said recess means, a track slidably supporting said latch, and an external handle secured to said latch for moving the same between said first and second positions.

21. Apparatus as claimed in claim 20 wherein said latch is on said cover, said cover being provided with a slot through which said handle penetrates and in which said handle is slidable, said latch being of larger size than said slot to block entry of light into the casing.

22. Apparatus as claimed in claim 1 wherein said casing has a recess on the wall thereof to which the cover is connected, said recess accommodating the internal structure of the reproduction machine when installed thereon, said casing being provided with further recesses proximate said recess on the wall of the casing for receiving clamps of the reproduction machine.

23. A paper holder as claimed in claim 9 wherein said latch means comprises a slidable latch engageable with said recess means, a track slidably supporting said latch, and an external handle secured to said latch for moving the same between said first and second positions.

24. A paper holder as claimed in claim 23 wherein said latch is on said cover, said cover being provided with a slot through which said handle penetrates and in which said handle is slidable, said latch being of larger size than said slot to block entry of light into the casing.

25. A paper holder as claimed in claim 9 wherein said casing has a recess on the wall thereof to which the cover is connected, said recess accommodating internal structure of the reproduction machine when installed thereon, said casing being provided with further recesses proximate said recess on the wall of the casing for receiving clamps of the reproduction machine.

* * * * *